Patented Dec. 12, 1939

2,183,178

UNITED STATES PATENT OFFICE 2,183,178

ANTIFREEZE SOLUTION

Ollie M. Williams and James W. Baker, Vandalia, and Benjamin F. Butler, Auxvasse, Mo.

No Drawing. Application June 13, 1938, Serial No. 213,532

1 Claim. (Cl. 252—5)

This invention relates to antifreeze solutions and has for an object to provide a solution of this type which will not corrode the cooling water system of an internal combustion engine and which on the other hand will dissolve all foreign matter and prevent scum forming on the surface of the solution when in use in the system so that the cake and scale which ordinarily retards circulation and lowers the efficiency of the system will be eliminated.

Calcium chloride, in aqueous solution, forms hydrochloric acid through hydrolysis of the calcium chloride and this acid attacks the metal of the cooling system.

We have discovered that when potassium iodide is added to the solution, together with citric acid and glycerine the corroding effect of the calcium chloride is entirely eliminated.

In preparing the antifreeze solution calcium chloride is first mixed with water. To this caustic solution is added glycerine which quickly dissolves in the solution. Potassium iodide is then mixed with the solution. Next citric acid, which may be obtained from the juice of lemons, is added.

For the preparation of this antifreeze it has been found that the following proportions of ingredients are desirable.

| | | |
|---|---|---|
| Water | gallons | 5 |
| Calcium chloride | pounds | 20 |
| Glycerine | pints | 5 |
| Potassium iodide | ounce | 1 |

The strained juice of 4 lemons.

Green aniline dye sufficient to distinctively color the solution.

In the product the potassium iodide dissolves foreign matter and prevents the formation of scum on the surface of the solution when in use in the cooling system. Thus when the system is drained and washed it will be free from all cake and scale which would retard circulation and lower efficiency were it allowed to remain in the system.

The citric acid has been found to dissolve grease in the system and keep the system clean and also it has been found to retard loss of the solution by evaporation.

The glycerine, together with the potassium iodide and citric acid, destroys the corroding powers of the calcium chloride and prevents the calcium chloride from crystallizing from the solution.

In practice the above formula will make five gallons of the antifreeze solution and this is thinned with five gallons of water to make ten gallons of solution ready for the cooling system. The antifreeze solution will not freeze at a temperature of 30 degrees below zero fahrenheit.

The green aniline dye imparts a distinctive pea green color to the solution for the purpose of marketing the solution in a distinctive color which cannot be confused with conventional antifreeze solutions.

What is claimed is:

An antifreeze solution consisting of the reaction product of following ingredients in the following proportions:

| | | |
|---|---|---|
| Calcium chloride | pounds | 20 |
| Water | gallons | 5 |
| Glycerine | pints | 5 |
| Potassium iodide | ounce | 1 |

Strained juice of 4 lemons.

OLLIE M. WILLIAMS.
JAMES W. BAKER.
BENJAMIN F. BUTLER.